Nov. 12, 1957  D. M. HARVEY  2,812,755
ENGINE STARTER AND METHOD
Filed June 8, 1956  12 Sheets-Sheet 4
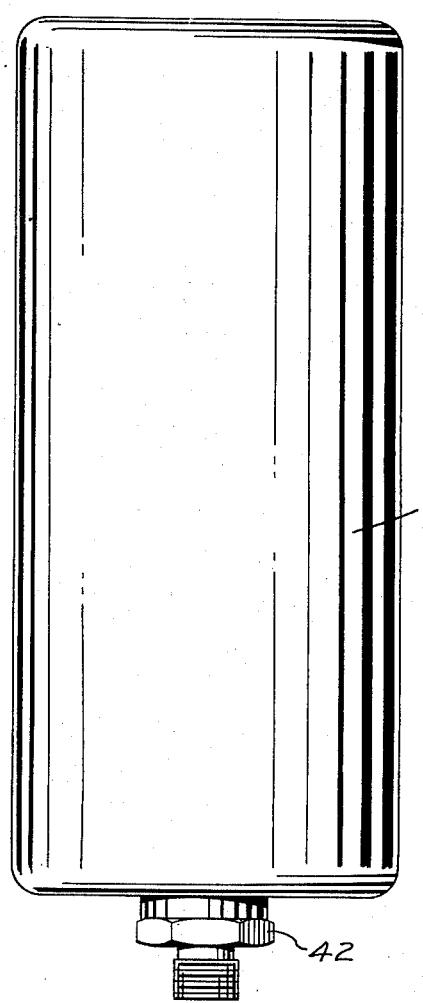
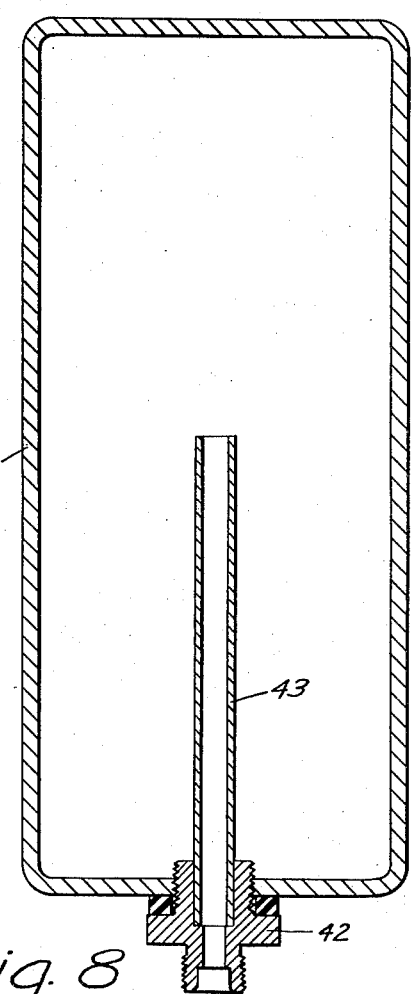
Fig. 7
Fig. 8
INVENTOR.
Draper M. Harvey Nov. 12, 1957 D. M. HARVEY 2,812,755
ENGINE STARTER AND METHOD
Filed June 8, 1956 12 Sheets-Sheet 5

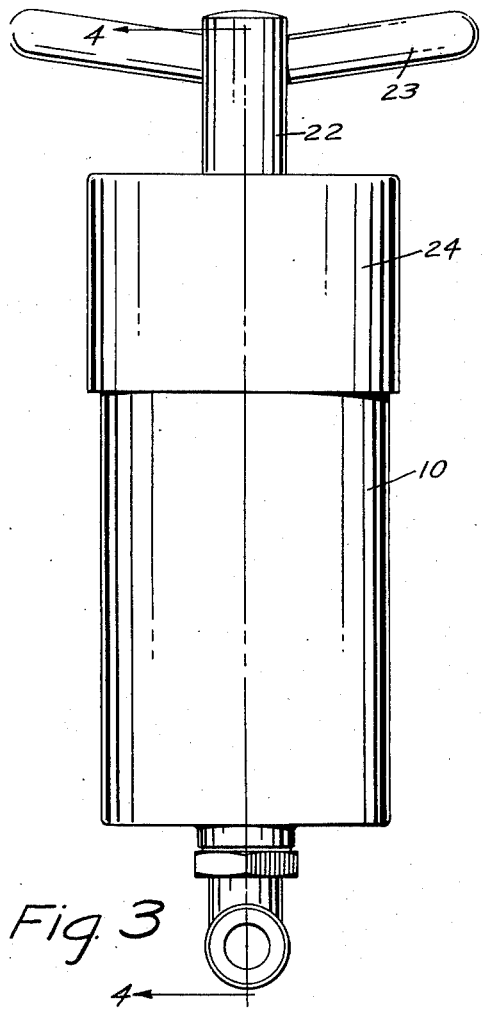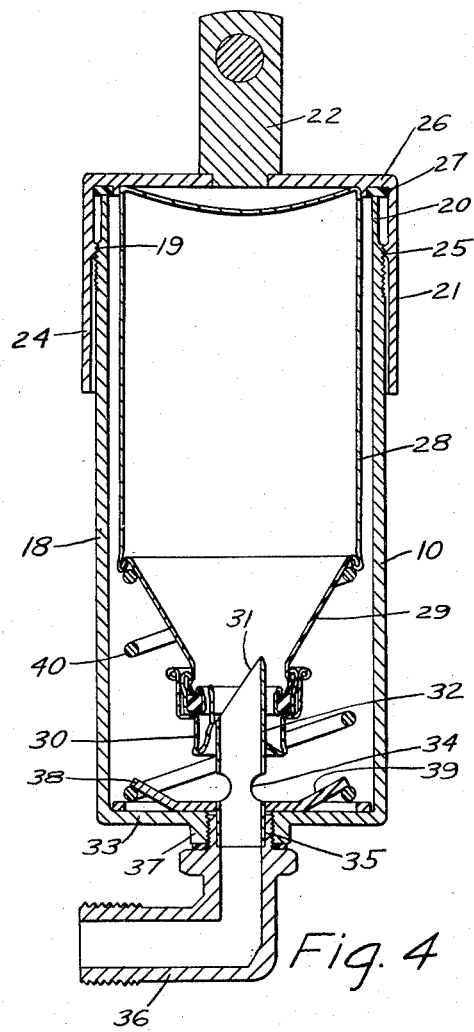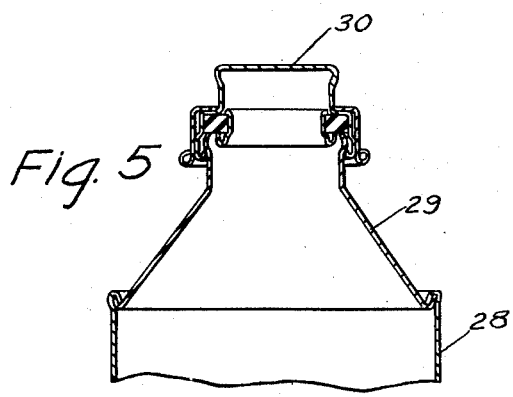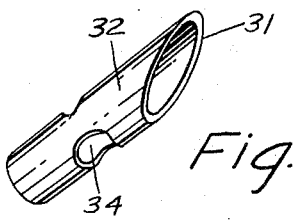

INVENTOR.

INVENTOR.
Draper M. Harvey

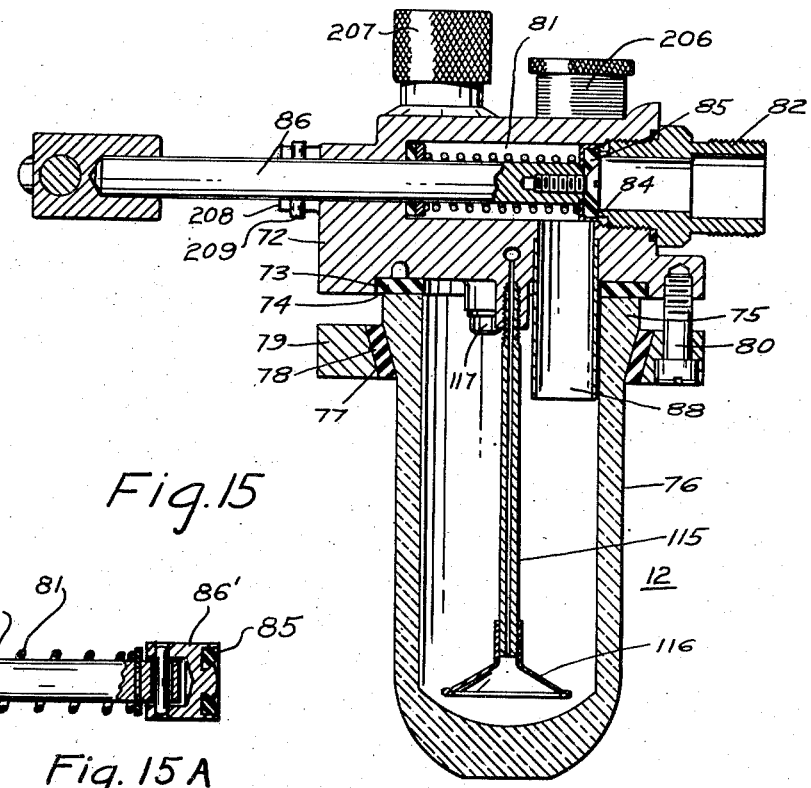

Nov. 12, 1957  D. M. HARVEY  2,812,755
ENGINE STARTER AND METHOD
Filed June 8, 1956  12 Sheets-Sheet 8

INVENTOR.
Draper M. Harvey

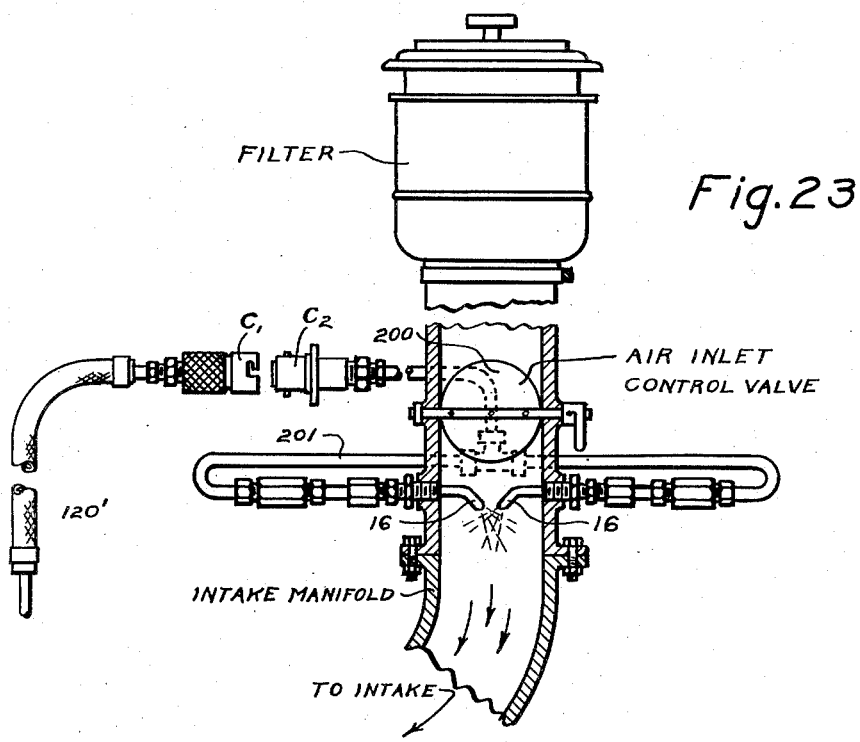
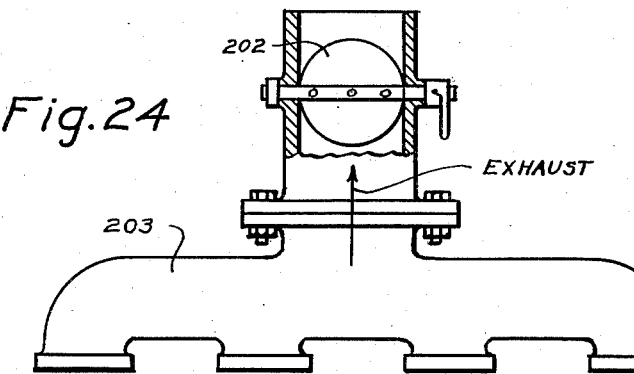
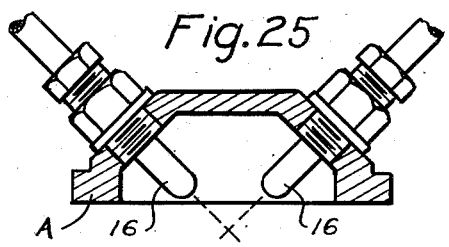

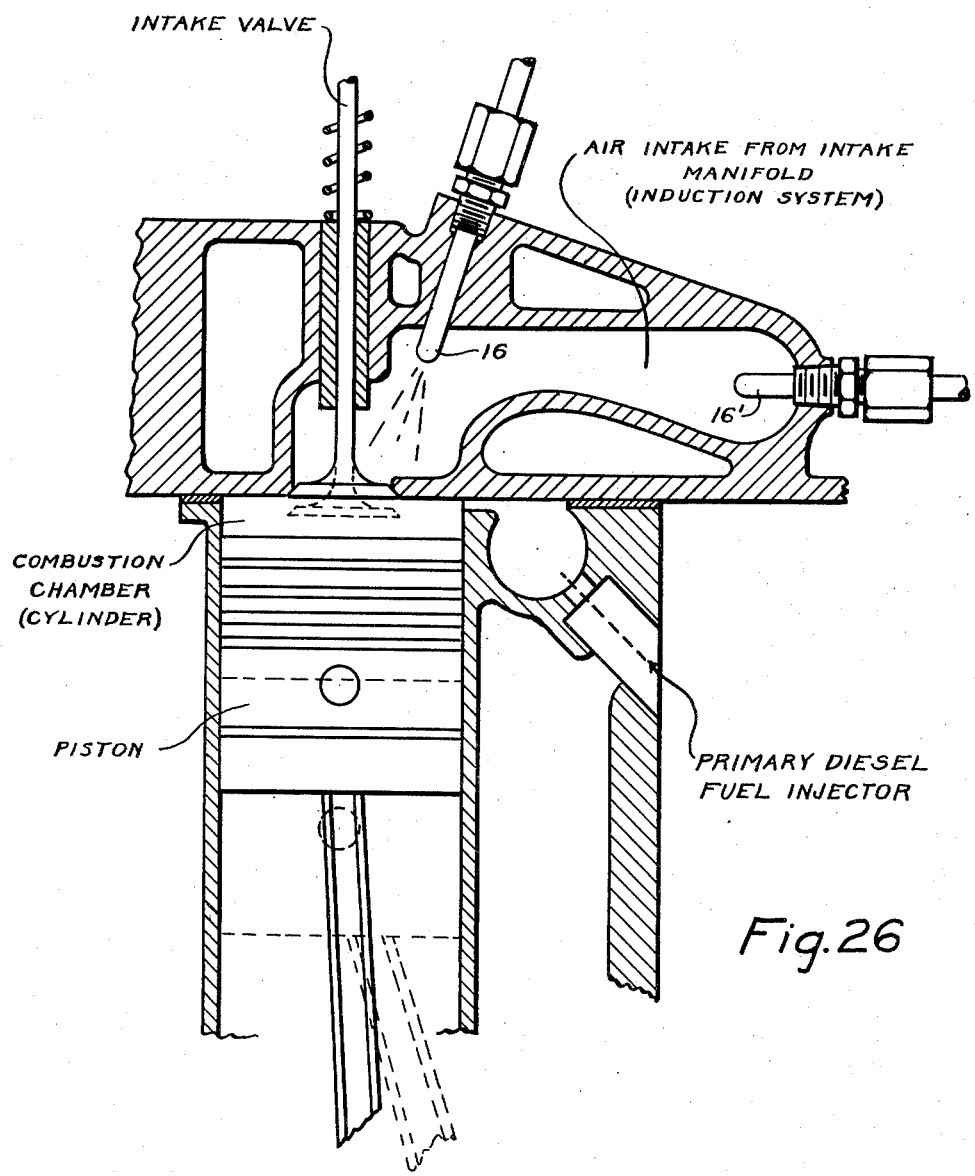

United States Patent Office 2,812,755
Patented Nov. 12, 1957

2,812,755

ENGINE STARTER AND METHOD

Draper M. Harvey, Hingham, Mass., assignor to Automotive & Marine Products Corporation, Boston, Mass., a corporation of Massachusetts Application June 8, 1956, Serial No. 590,195

12 Claims. (Cl. 123—180)

This application is a continuation-in-part of applications Serial Nos. 310,583 and 424,602 filed September 20, 1952, and April 21, 1954, respectively, for Starting Fluid Injection Device.

The present invention relates to the automotive engine art, and has particular reference to starting methods and to an Aerosol fluid applicator starting device construction therefor.

The principal object of the invention is to provide a new and improved auxiliary automotive engine starting device and method which utilizes a mixture of regulated pressure air and a starting or treatment fluid of metered volume and porportions, which is injected into the controlled carrier air or air-fuel stream of the automotive engine in the form of a finely comminuted vapor spray for direction or aspiration evenly to the combustion chamber, cylinder or cylinders of the automotive engine.

Another object of the invention is to provide a new and improved auxiliary starting device, which includes a storage compartment for bulk fluid containing an ample supply of starting fluid.

Another object of the invention is to provide an auxiliary starting device, which includes a storage compartment for bulk fluid containing an ample supply of starting fluid within a separate and originally sealed container, said separate container being automatically pierced and punctured when placed within said storage compartment, without exposure, to the operator, of the volatile and inflammable fluid.

Another object of the invention is to provide an auxiliary starting device, which includes a storage compartment for bulk fluid containing an ample supply of start-volume and proportions, which is injected into the coning fluid, a metered volume of which may be communicated by gravity or pressure through a singular and connective hose from the bulk fluid container through a valve mechanism to a visible reservoir.

Another object of the invention is to provide a novel auxiliary starting device, which includes a storage compartment for bulk fluid containing an ample supply of starting fluid which may be communicated by gravity or pressure through a connective hose from the bulk fluid container to provide a metered use of the fluid within the bulk fluid container when such a volume may be necessary for the initiation and continuation of ignition within an automotive engine.

A further object of the invention is to provide new and improved means for the accumulation of a regulated and adjustable volume of pressurized air, either manually by the use of a hand pump or by an independent source of compressed air.

Another object of the invention is to provide a new and improved auxiliary starting device, which provides for the storage, regulation and transmission of pressurized air from within a container or containers and throughout a controlled pneumatic circuit independently of the fluid circuit, as a safety measure.

A further object of the invention is to provide a starting device in which pressurized air and starting fluid are metered, adjusted, controlled and injected in accordance with the engine size, type and condition, and the ambient air or storage temperature.

A further object of the invention is to provide a novel starting device in which pressurized air and starting or treatment fluid are metered, regulated, controlled and injected by means of manually operated valves to cause the accumulation and transmission of controlled proportions of air and starting fluid, by the employment of pressure differentials, through a common communicating channel to a nozzle or nozzles, wherein an Aerosol mixture is developed for injection to the induction system and thence for transmission to the combustion chamber of an automotive engine, as opposed to conventional solid fluid injection.

An additional object of the invention is to provide a novel auxiliary starting device which can be operated by one man, in conjunction with other essential controls common to an automotive engine, and which can be controlled readily for starting an automotive engine, and, if required, supply to the engine a continuous injection of starting fluid in Aerosol form to support and sustain combustion, until satisfactory combustion characteristics have been developed within the engine and primary engine fuel may be throttled to the engine.

An additional object of the invention is to provide an auxiliary starting device which can be operated by one man, in conjunction with other essential controls, and which enables the operator to sustain injection of an Aerosol mixture by manual means even though the previously accumulated pressurized air within the air reservoir may have been exhausted.

An additional object of the invention is to provide an auxiliary starting device which is not dependent on physical characteristics, such as vapor pressure of the starting or treatment fluid, or on ambient temperature conditions, to produce a controlled proportioned discharge of fluid and air to the induction system of an automotive engine in Aerosol form, since a mechanical separation of the fluid and air takes places at the terminal nozzle or nozzles to cause the pressurized injection of finely comminuted particles of fluid within the carrier air.

An additional object of the invention is to provide an auxiliary starting device which includes a hand pump containing a piston with an oil or fluid reservoir, the principle of which is to maintain the compression efficiency of the piston action within the cylinder at extremely low temperatures by metering the oil or fluid to annular grooves on the surface of the piston, whereby the viscosity of the oil or fluid compensates for shrinkage and clearance changes at low temperatures through an increase in viscosity of the oil or fluid.

An additional object of the invention is to provide a starting device which may be portable, and which includes a connective flexible hose to which may be attached one part of a self-sealing coupler for convenient attachment to a mating portion of a self-sealing coupler, said device being mounted conveniently on the engine or dash panel thereof, and thence communicating to the induction system of an engine.

An additional object of the invention is to provide a starting device which may be portable or of permanent installation and which may be supplied with pressurized air from an independent source or by means of a hand-operated pump, and which is operative at ambient temperatures in the order of minus 65 degrees F., to provide for the controlled injection of metered proportions of pressurized air and starting fluid in the form of a finely comminuted vapor spray into the intake manifold or induction system of an engine as a saturated, combustible mixture, irrespective of the ambient temperature since mechanical atomization of the charge is developed without dependence on the vapor pressure characteristics of the starting fluid.

An additional object of the invention is to provide a starting device which may be portable, and which incorporates a connective flexible hose to which is attached one part of a self-sealing coupler for convenient attachment to several independently mounted mating portions of a self-sealing coupler device, any one of which may be mounted on an independent engine or vehicle, thereby facilitating the use of the portable starting device on several vehicles.

An additional object of the invention is to provide a starting device which may be either portable or installed permanently on an engine or vehicle for use as an auxiliary cranking aid, irrespective of the method which may be employed to crank the engine, and which will be useful when cranking potential is either of short duration, as with an air-accumulator type of cranking motor, or with a low order of revolutions per minute, as with electric cranking motors, at low ambient operating temperatures.

An additional object of the invention is to provide an auxiliary starting device which is effective for the purpose of carburetion and distribution of any combustible liquid and air independently of conventional carburetion facilities on an engine, and which will provide for the discharge into and saturation of intake manifold carrier air at temperatures substantially below the effective carburetion and combustion range of conventional internal combustion engine fuels.

An additional object of the invention is to provide an auxiliary starting device which is effective for the purpose of carburetion and distribution of any natural or synthetic lubricant and air, and which provides for the introduction of such materials internally to the several critical reciprocating parts of an engine by normal aspiration of the saturated air mass within the induction system into the combustion chamber area during motoring to develop stand-by and pre-lubrication of valves, rings, cylinder walls and pistons before combustion is developed, or to prepare the engine for subsequent operation under adverse and sub-zero temperatures, when normal lubrication facilities are inadequate.

An additional object of the invention is to provide an auxiliary starting device which is effective for the purpose of carburetion and controlled distribution of an Aerosol mixture of fluid and air as a combustible mixture into a confined area, such as the induction system of an engine of the diesel type, wherein and at the point of injection the Aerosol mixture may be ignited and ignition sustained during normal aspiration to result in the communication of high temperature air to the combustion chamber or cylinder or cylinders of an engine.

A further object of the invention is to provide an adjustable starting device for introducing controlled proportions of pressurized air and starting fluid in the form of a finely comminuted vapor spray into a controllable volume of carrier air, as within the intake manifold or induction system of an engine to result in a saturation of the carrier air with even distribution of the combustible mixture on aspiration to one or more cylinders.

A further objective of the invention is to provide an adjustable starting device for introducing controlled proportions of pressurized air and starting fluid in the form of a finely comminuted vapor spray into a controllable volume of carrier air, as within the intake manifold or induction system of an engine, with the input of pressurized air and starting fluid divided into a two-stage flow pattern wherein initial input of starting fluid is regulated by the volume and pressure of air from within an air reservoir as metered through a primary air orifice, and a secondary stage input is regulated by the residual volume of pressurized air above the fluid level within the metering reservoir and through a primary air orifice with the air supply from the auxiliary air reservoir closed off, in this manner providing for an initial input of enriched carrier air to initiate ignition promptly, and a secondary input of a leaner mixture to support ignition automatically, and without the assistance of an operator of the device.

A further object of the invention is to provide for an adjustable starting device for introducing controlled proportions of pressurized air and starting fluid in the form of a finely comminuted vapor spray into a controllable volume of carrier air, as within the intake manifold or induction system of an engine, with the volume of carrier air admitted to the induction system through a conventional or auxiliary valve, such as a manually or mechanically operated choke valve or valves to result in the development of a controlled saturated atmosphere which may be aspirated to the cylinder or cylinders of an engine in such proportions as to result in a combustible mixture, either on compression of the charge, as within a diesel-type engine, or in contact with a spark igniter, as within a gasoline engine.

Another object of the invention is to provide an auxiliary starting device which may be used independently or cooperatively with a manually or mechanically operated valve or valves on the induction system of an engine whereby satisfactory combustion characteristics may be developed as provided for by the use of the engine starter with the atmosphere of combustion to the engine controlled by the use of the valve or valves at the air intake of the induction system to result in a controlled input of primary air to avoid flame-out through quenching, and to increase engine cranking or motoring speeds through a reduced compression load on the pistons by a decrease in the air mass.

Another object of the invention is to provide an auxiliary starting device which may be used independently or cooperatively with a manually or mechanically operated valve or valves on the exhaust system of an engine whereby sustained combustion characteristics may be developed as provided for by the use of the engine starter with the discharge of the ignited auxiliary and primary fuel charges to the engine restricted or prevented to implement a maximum retention of continuous fire within the engine and facilitate rapid warm-up and sustained combustion under adverse ambient temperature conditions.

A further object of the invention is to provide for an adjustable starting device for introducing controlled proportions of pressurized air and starting fluid in the form of a finely comminuted vapor spray into a controllable volume of carrier air, as within the intake manifold or induction system of an engine, to result in the development of a saturated atmosphere therein, which may be aspirated evenly to the cylinders of a multi-cylinder engine in combustible proportions, wherein the compression of the charge of saturated air by the reciprocation of a piston will elevate the temperature of the charge by compression reactions and thermo-chemical changes within the aspirated and compressed charge to a temperature potential which will result in the spontaneous and sustained ignition of the primary fuel when the primary fuel is injected into the cylinder, as within the cylinder of a diesel-type engine, and the primary fuel comes in contact with the compressed and saturated auxiliary charge of high temperature values.

Another object of the invention is to provide an auxiliary starting device for introducing controlled proportions of pressurized air and starting fluid in the form of a finely comminuted vapor spray into the intake manifold or induction system of an engine as a saturated, combustible mixture coincidental with initial cranking of the engine, whereby prompt compression ignition of the mixture elevates the temperature of the charge to the cylinder to a heat factor which is sufficiently high to obviate or avoid any quenching reaction of the primary fuel injection upon contact with the charge which would reduce the thermal potential of the auxiliary charge below the ignition potential point of the primary engine fuel.

Another object of the invention is to provide an auxiliary starting device for introducing controlled proportions of pressurized air and starting fluid in the form of a finely comminuted vapor spray into the intake manifold or induction system of an engine as a saturated, combustible mixture for aspiration to the cylinder of a diesel engine on the primary or intake stroke and as a continuous and controllable volume of treatment fluid with a predeterminable proportion to the volume of primary diesel fuel, whereby the compression reaction of the piston on the auxiliary charge will elevate the air mass temperature to a point where contact with the primary fuel at the time of injection, under variable throttle positions, will avoid any depressive temperature condition of the combined elements of combustion which can produce initial thermal decomposition of the primary diesel fuel charge by exposure to temperatures below the point of adequate ignition temperature to result in excessive cetane requirements, power loss and excessive discharge of exhaust gases and residual fuel particles.

A further object of the invention is to provide for an adjustable starting device for introducing controlled proportions of pressurized air and starting fluid in the form of a finely comminuted vapor spray into a controllable volume of carrier air, as within the intake manifold or induction system of an engine, to result in the development of a saturated atmosphere therein, which may be aspirated evenly to the combustion chamber, cylinder or cylinders of an engine in such proportions as may be required to result in the production of peroxides within the charge by thermo-chemical reactions on compression by the reciprocating action of a piston, and which charge with a high proportion of peroxides may be re-cycled within the cylinder by blocking or restricting the exhaust outlet to develop a charge with superior ignition characteristics at low temperatures.

A further object of the invention is to provide for an adjustable starting device for introducing controlled proportions of pressurized air and starting fluid in the form of a finely comminuted vapor spray into a controllable volume of carrier air, as within the intake manifold or induction system of an engine, to result in the development of a saturated atmosphere therein, which may be aspirated evenly to the cylinder or cylinders of an engine in such proportions as may be required to result in the ignition of the charge by the action of a spark igniter, as within a gasoline engine, or by the compression reaction of a piston, as within a diesel engine, and to continue the controlled injection of the pressurized air and starting fluid into a controllable volume of carrier air in sufficient volume to provide for a saturated atmosphere which will support combustion when aspirated to a cylinder, without the use of primary fuel, and to facilitate the continuous combustion cycling operation of the engine at a high order of cranking speed, under throttle control provided for by the device, during the critical warm-up period, and to reduce warm-up time as required with normal engine operation, using normal engine fuels.

Another object of the invention is to provide an auxiliary starting device for introducing controlled proportions of pressurized air and starting fluid in the form of a finely comminuted vapor spray into the intake manifold or induction system of an engine as a saturated, combustible mixture coincidental with initial cranking of the engine by any mechanical or electrical means, whereby prompt compression ignition of the saturated, combustible mixture is instantly developed by the mechanical action of the piston or pistons, and sustained combustion of the controlled and continuous injection of the auxiliary starting fluid charge to and within the engine will continue engine cranking or motoring at an increased rotating speed beyond the energy or torque capacity of the primary cranking source, and independently of the primary cranking source after the first fire or initial ignition.

Another object of the invention is to provide for an adjustable starting device for introducing controlled proportions of pressurized air and starting fluid in the form of a finely comminuted vapor spray into the intake manifold or induction system of an engine, with additional carrier air being supplied by a manually or mechanically controllable valve positioned behind the spray nozzle or nozzles, which connect to the induction system, to increase the forward motion of the air-starting fluid mixture into the manifold and to improve the saturation of the air therein, through the elimination of a low pressure area behind the nozzle or nozzles which is developed by the ram effect of the issuing of the pressurized air-starting fluid mixture from the nozzle into a confined area.

Another object of the invention is to provide for an adjustable starting device for introducing controlled proportions of pressurized air and starting fluid in the form of a finely comminuted vapor spray into the intake manifold or induction system of an engine to result in the development of a saturated atmosphere therein by the use of a nozzle or nozzles which issues starting fluid mixed with air as a rotating hollow cone, of any desired or indicated angle, to assure that incoming and aspirated carrier air will commingle totally with injected and aerated charge of starting fluid.

A further object of the invention is to provide for an adjustable starting device for introducing controlled proportions of pressurized air and starting fluid in the form of a finely comminuted vapor spray into the intake manifold or induction system of an engine to result in the development of a saturated atmosphere therein by the use of opposed nozzles, which may be regulated and adjusted in any plane and by any requirement of distance between the opposing nozzles to impact the opposing spray patterns in order to produce a more effective saturation of the carrier air by increasing the turbulence therein, and by more finely dividing the fluid particles which are to be entrained within the carrier air.

A further object of the invention is to provide for an adjustable starting device for introducing controlled proportions of pressurized air and starting fluid in the form of a finely comminuted vapor spray into a controllable volume and flow pattern of carrier air, as within the intake manifold or induction system of an engine to result in the development of a completely saturated atmosphere therein, by the use of opposed nozzles which intercept at any required point and angle from 180 degrees to cause a low pressure air path behind and at the point of spray interception to result in the deflection of carrier air and its controlled direction into a region of injection where maximum saturation of the carrier air will develop.

A further object of the invention is to provide for an adjustable starting device for introducing controlled proportions of pressurized air and starting fluid in the form of a finely comminuted vapor spray into a controllable volume of carrier air, as within the intake manifold or induction system of an engine to result in the development of a completely saturated atmosphere therein, by the use of a multiple number of spray nozzles, which may be connected by a singular communicating channel at the control head of the device, but which will provide for a uniform discharge of an aerated mixture from each nozzle into the induction system of an engine.

Another object of the invention is to provide an auxiliary engine starting device which may be used independently or cooperatively with a solenoid valve controlling the output of air-fluid mixture to the induction system of an engine by electrical means whereby the operation of the solenoid valve is dependent on the depression or connection of the starting motor switch to result in the simultaneous discharge of starting fluid to the engine and engine cranking by the primary cranking power source, With the above and other objects and advantageous features in view, the invention consists of a novel arrangement of parts more fully disclosed in the detailed description following a preferred embodiment thereof, and more specifically defined in the claims appended thereto.

In the drawings,

Fig. 3 is a front elevation of the fluid storage compartment of Fig. 1;

Fig. 4 is a vertical section on the line 4—4 of Fig. 3;

Fig. 5 is an enlarged sectional detail of the upper portion of a fluid container;

Fig. 6 is an enlarged perspective detail of the container piercing tube;

Fig. 7 is an elvation of the air storage tank of Fig. 1;

Fig. 8 is a central vertical section of Fig. 7;

Fig. 15 is a section on the line 15—15 of Fig. 14;

Fig. 15A is a fragmentary view of a modified fluid transfer valve;

Fig. 16 is a sectional detail on the line 16—16 of Fig. 14;

Figs. 23 and 24 are schematic diagrams of inlet and exhaust controls;

Fig. 25 is a fragmentary view of a modified nozzle arrangement; and

Fig. 26 is a schematic representation of the relation of the engine cycling to the starting-fluid injection.

It has been found desirable to provide an auxiliary starting device for spark and compression ignition engines, which will operate at normal and at extremely low temperatures, and will permit of the manipulation of the controls thereof by an operator clothed with winter gear, including heavy gloves. It has been found, also, to be desirable to provide an auxiliary starting device which will crank or motor an engine independently of the use of primary fuels, or after initial ignition has been developed without the further use of common mechanical, manual or electrical cranking devices. It has been found, too, to be desirable to permit the use of such a device with suitable ignition or treatment fluids wherein minor modifications of the constructive details thereof may be made to provide for an adequate storage facility to contain treatment fluids and an adequate source of pressurized air to permit of the introduction of metered proportions of the treatment fluids and air into the induction system of an engine by normal aspiration, thereby to improve combustion efficiency of the primary fuel charge as reflected by a substantial increase in brake horsepower, and to reduce the cetane requirements of fuel, as within a diesel engine. It has been found desirable to provide an auxiliary starting device for spark and compression ignition engines, which will operate to provide to such engines a saturated air mass mixture with inflammable potential and compression ignition potential at extremely low temperatures, and, below such characteristics, for normal engine fuels at low ambient temperatures. To this end, the present invention contemplates a combination of parts to store, meter and disperse a predetermined volume of starting or treatment fluid in a predetermined volume of pressurized air, to thereby obtain a finely comminuted vapor spray into the induction system of an automotive engine by direct injection with the development of a saturated air mass therein for aspiration evenly to the combustion chamber, cylinder or cylinders of an engine, wherein spark or compression ignition may be developed instantly and under adverse temperature conditions.

Figure 1:
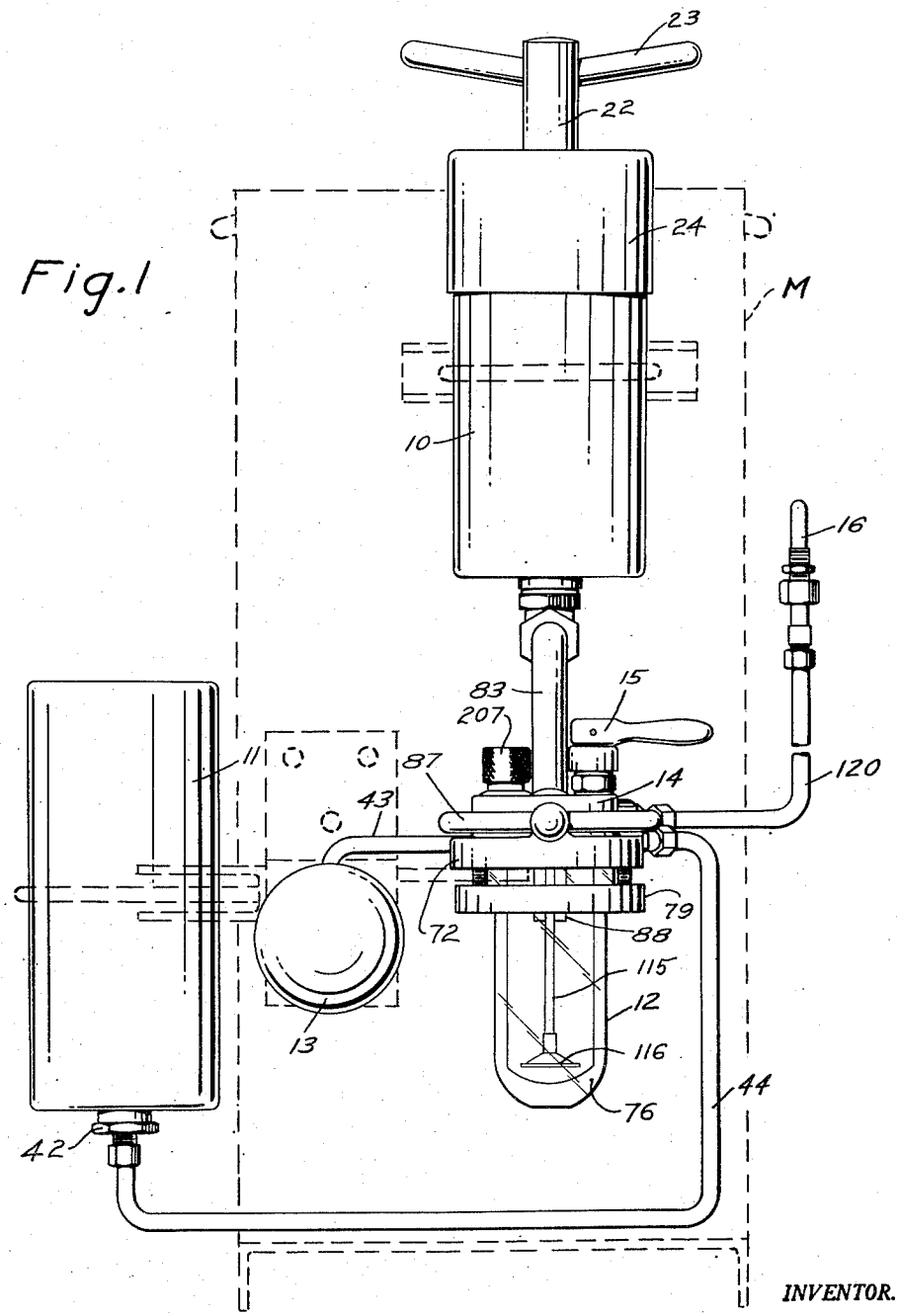
Fig. 1 is a front elevation of an elective arrangement of starting device parts embodying the invention.

The preferred parts for the starting device, all of which may, if desired, be mounted upon a portable mount M to facilitate its use, include a fluid supply chamber 10, an air supply tank 11, a fluid measurement chamber 12, an air supply pump 13, a mixing head 14, an air control valve 15, a check valve spray nozzle 16, and a flow valve 17 for controlling flow of starting fluid to a spray nozzle or nozzles, which may be disposed in an opposing manner to provide converging or overlapping vapor-mist sprays, as shown in the embodiments of Figs. 23 and 25, a valve or valves 200, Fig. 23, for controlling the volume of external air aspirated to the induction system 201 of an engine, a valve or valves 202, Fig. 24, for controlling or closing off in varying degrees the discharge of inflamed gases from the exhaust system 203 of an engine, and a spring loaded fluid flow valve 85, Fig. 5, which effectively seals fluid within a chamber 10, Fig. 1, under static or elevated pressures, and permits the transfer of a measured or continuous volume of fluid from chamber 10 to the air-fluid measurement chamber 12.

*The fluid supply chamber*

The fluid supply chamber or compartment 10, see Fig. 1, is designed to hold an ample supply of starting fluid for a number of starts, as determined by the engine size and operation condition and the temperature conditions and includes a cup-shaped cylinder 18, note Fig. 4, which is threaded at its upper portion 19 and has its upper end 20 recessed as illustrated. A screw cap 21 with a central post 22 and manually engageable turning wings 23 is provided with a depending skirt 24 which is internally threaded as indicated at 25 to engage the cylinder threads 19, the cap top having an annular recess 26 seating a resilient washer 27 which engages the cylinder upper end 20.

It is preferred to supply the starting fluid in sealed cans for insertion within the compartment or chamber 10, for piercing therein. One suitable form of can 28 is disclosed in Figs. 4 and 5, with a conical top 29 and a closure 30 of thin frangible metal seal locked on the conical top 29. When the can 27 is inverted and is placed in the chamber 10, see Fig. 4, its closure 30 rests on the upper inclined end 31 of a piercing tube 32 which extends upwardly through the base 33 of the chamber 10, the tube having wall openings 34 and being seated in an annular recess 35 of a nipple 36 which is threadlocked to the threaded outer wall of a flange 37 depending from the chamber 10. The pressure differential resulting from the inclined nature of the piercing end 31 provides for adequate controlled flow of fluid under the influence of gravity into the metering or measuring compartment or chamber 12.

A spring retainer disk 38 is seated on the base 33 of the chamber 10, and has bent up fingers 39 which grip the lower end of a coil spring 40 shaped to resiliently receive and to center the can 28, see Fig. 4, whereby manual turning of the screw cap 21 in a clockwise direction forces the can downwardly on the piercing tube to pierce the closure 30 and thus release the starting fluid from the can 28; the spring 40 then forces the empty can outwardly to facilitate replacement. When the chamber 10 is at atmospheric pressure the screw cap 21 may be removed for refill of starting fluid. If the chamber 10 should develop an elevated pressure condition due to the pressure characteristics (vapor) of the starting fluid, gasoline or other treatment fluids, the pressure therein may be safely released to the engine directly, rather than to the atmosphere, by the use of the fluid flow valve 85, Fig. 15, with the air-fluid valve positioned in an upright or open manner, at which time the closure 24 may be removed by the operator. The closure 24 seals the compartment or chamber 10 to prevent the escape of fluid vapors to the outside, thus protecting against a hazardous condition and protecting the operator.

The air supply tank and the air pump

The air supply compartment or tank 11 may be of any required type and size, and in use can assume virtually any angular disposition that may be necessary or desirable. It will be understood that the size of compartment or tank 11 will be determined by the necessary volumetric potential for an indicated amount of fluid air discharge over an equated time interval which is dependent on engine size and displacement. Tank 11 comprises a hollow cylinder 41 which has a flow nipple 42 at one end thereof, in which a flow tube 43 is mounted. Any available source of pressurized air may be connected to the flow nipple 42, but it is preferred to use a hand-operated pump 13, which is mounted on a suitable bracket in any plane or angle convenient to the operator and is connected to the air supply tank through conduits 43, 44 and an air pressure regulator as hereinafter described.

The pump 13 may be of the type disclosed in co-pending Serial No. 424,601, filed April 21, 1954, for Air Pressure Regulator for an Engine Starter Device, which utilizes a hollow oil-filled piston rod and piston, but preferably is of the type illustrated, with a metal hollow piston, an oil felt retainer, an oil reservoir, a cylinder, a universal-joint shaft, and a gripping handle.

Figure 9:
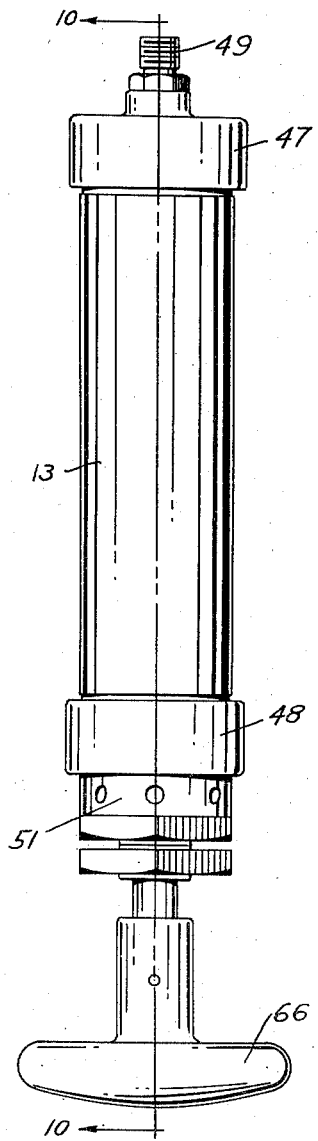
Fig. 9 is a plan view of the air pump of Fig. 1.
Figure 10:
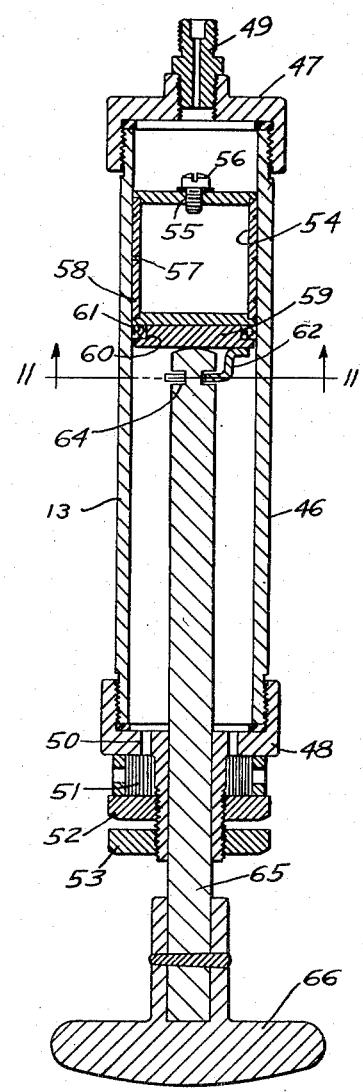
Fig. 10 is a section thereof on the line 10—10 of Fig. 9.
Figure 11:
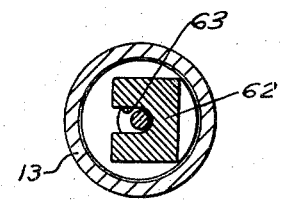
Fig. 11 is a section on the line 11—11 of Fig. 10.

As illustrated in Figs. 9, 10 and 11, the pump 13 includes a thick metal cylinder 46 having threaded outer and inner ends 47, 48, the outer end 47 having an outflow nipple 49 and the inner end being equipped with air inflow ports 50, a filter ring 51 and lock nuts 52, 53. A hollow piston 54 of thinner metal than the metal of the cylinder walls functions as an oil reservoir, and has air inlet 55 closed by a lock screw 56, the side wall of the piston having an oil flow port 57 and annular V shaped grooves 58 in which oil accumulates and assumes an outwardly rounded form, with compensatory film strength and volume at extremely low temperatures to compensate for contraction and shrinkage.

Figure 12:
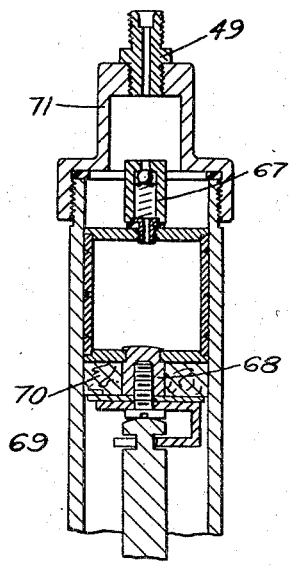
Fig. 12 is a detail view of a modified pump construction.

A disk 59 is secured to the inner piston end, and has an annular groove 60 in which a felt washer 61 is seated, the disk 59 having a depending finger 62 with a slot 63 adapted to loosely receive an annular groove 64 at the outer end of a piston rod 65 which extends from the cylinder end 48; a gripping handle 66, which may be of rubber, is secured thereto. If desired, the piston may have a ball check inlet 67 for inflow of oil, and may have a spacer fastener 68 and a washer 69 for mounting a large size felt disk 70, as illustrated in Fig. 12; the upper cylinder end may be shaped to mount the ball check inlet 68, as indicated by the reference numeral 71.

If desired, the piston may be constructed of leather impregnated with equal parts of perchloroethylene and Dow-Corning Silicone 1109 to control water absorption, and to provide sufficient self-lubricating qualities at extremely low temperatures.

The preferred pump size will deliver approximately two pounds of pressurized air to the air tank at each stroke, and will operate effectively down to —65° F. Each stroke of the pump discharges an oil mist to assure lubrication of the controls and check valves of the mixing and metering mechanism hereinafter described, the oil reservoir within the piston being replenished as required with a light, arctic-type oil.

The metering and mixing mechanism

Figure 13:
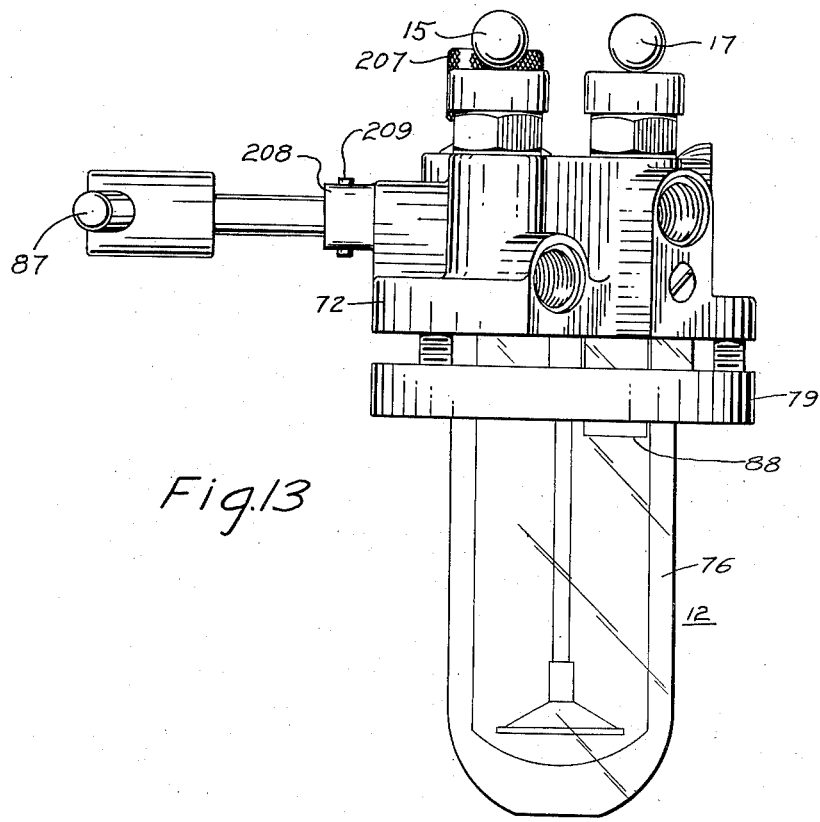
Fig. 13 is a front elevation of the fluid cup and the mixing head of Fig. 1.
Figure 14:
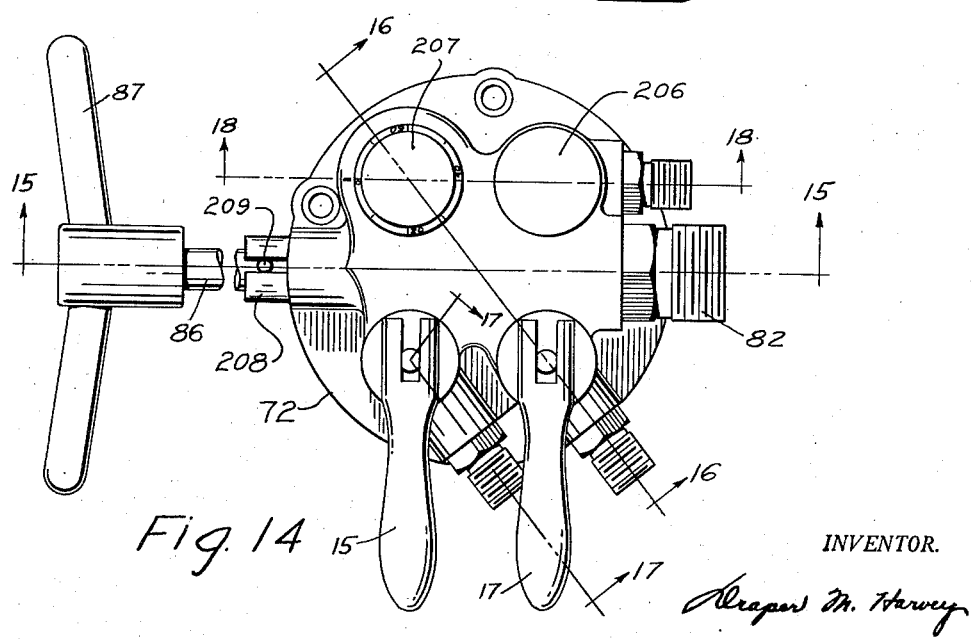
Fig. 14 is a top plan view thereof.
Figure 18:
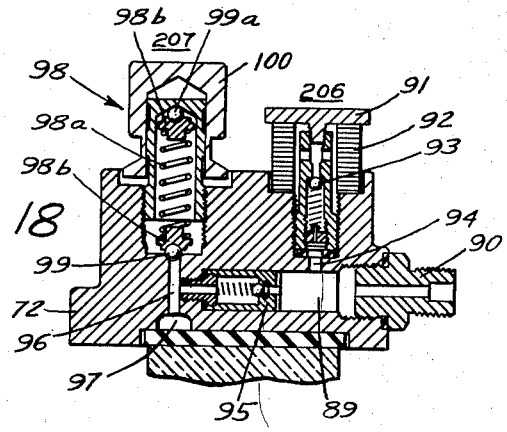
Fig. 18 is a sectional detail on the line 18—18 of Fig. 14.

The metering and mixing mechanism includes a fluid and air measuring compartment 12 which may be periodically filled from the fluid supply tank 10 and from the air reservoir 11, and is illustrated as a tempered glass bowl 76, Fig. 13, able to stand extremes of temperature, and a mixing head 72 which includes an air inlet filter with check valve 206, Fig. 18, an air valve 95, a pressure regulating check valve 207, a fluid inflow valve 85, Fig. 15, an air-metering conduit and orifice 117, Figs. 15 and 16, a fluid-metering conduit 115 with filter 116, a mixing passage or chamber 112, an air-fluid mixture outflow valve 17, Fig. 14, an air-control valve 15 and an air-fluid terminal connector 119 and filter 119′, Fig. 16.

The mixing head 72, see Figs. 13 to 15, is drilled externally and internally to provide flow channels and fittings for control and transmission of air, fluid, and air-fluid mixture, and is recessed on its lower surface as indicated at 73 to mount an annular resilient washer 74 against which the upper end 75 of the glass bowl 76 seats, the upper end 75 being cone-beveled as illustrated and seating against a conical resilient washer 77 in a conical opening 78 of a support disk 79 which is locked to the bottom of the mixing head by lock screws 80.

Figure 2:
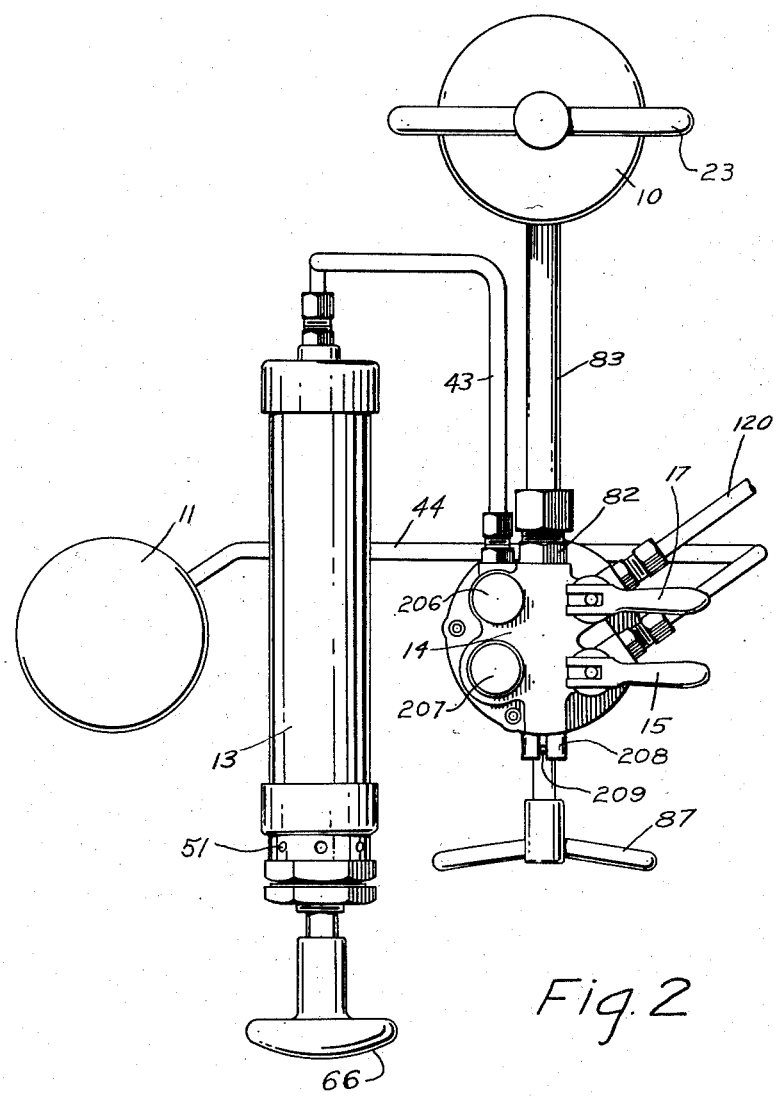
Fig. 2 is a top plan view of Fig. 1.

As shown in Fig. 15, the head 72 has a channel 81 internally threaded to receive a nipple 82 which is connected to the fluid supply chamber 10 by a conduit 83, see Figs. 1 and 2, the inner end of the nipple 82 being reduced in outside diameter to form a valve seat 84. A fill valve 85 in the channel 81 is spring pressed to seating closure on the seat 84, the valve 85 having a valve stem 86 which extends out of the mixing head through a suitable bore and has wings 87 whereby the valve 85 may be manually opened against spring pressure, and may be held in the member 208 by the groove pin 209 to allow fluid from the fluid supply chamber 10 to flow into the bowl 76 of the fluid-air measuring compartment 12 through a measuring inlet pipe 88, the fill valve 85 being released and closing as soon as the measured volume of fluid, as determined by the length of the measuring pipe 88, has been received in the bowl 76. The area above the fluid level is thereby available to contain a measured volume of pressurized air when admitted to the reservoir by the action of the air control valve 15 in Fig. 14. This action is positive and automatic and the fluid will fill to the base line or lower edge of the inlet pipe 88 after which the compression of air above the fluid level will brake the flow of fluid into the bowl 76 when the air-fluid valve 17, Fig. 14, is closed. It will be understood that conventional cam means associated with the member 208 may be provided to facilitate the opening of valve 85 against the action of its spring and also to maintain it in an open position when desired. A modified fluid transfer valve member 86′ is illustrated in Fig. 15A having a universal head.

Figure 19:
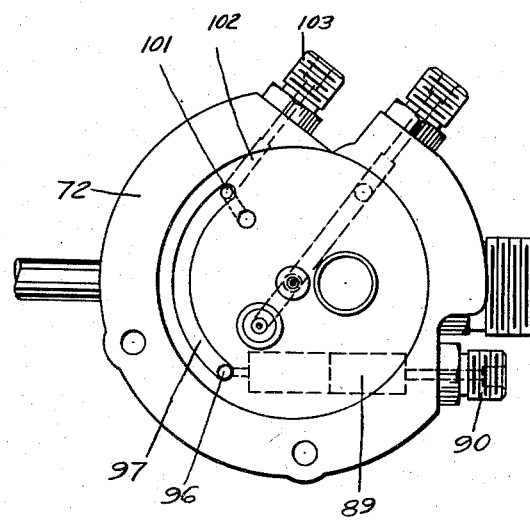
Fig. 19 is a bottom plan view of the mixing head.

The mixing head is supplied with pressure air from any available source, the preferred arrangement including the pump 13, which is connected to an air inlet chamber 89, see Fig. 19, through a nipple 90. The air inlet chamber 89 has an atmosphere air inlet assembly 91 which includes a filter 92, a check valve 93, and an inflow port 94 to the chamber 89, whereby the pump 13 can draw in atmospheric air and discharge the air on the pressure stroke back into the chamber 89 and through a check valve 95 into a flow passage 96. The passage 96 communicates with a flow channel 97 and also with a pressure regulator 98, which has a spring loaded check valve 99 adjustable to a desired pressure by turning an adjustment cap 100 having pressure indicia, whereby excess air pressure in the passage 96 is vented to atmosphere. It will be noted that the spring 98a is mounted between two holders 98b, each of which is provided with a cavity having positioned therein balls 99 and 99a, whereby compression may be exerted on the spring by clockwise movement of adjustment cap 100, and the spring will respond to compression evenly on either an ascending or descending vernier without being subjected to torsional distortion since it is movable axially on the two pivot or bearing points provided by the balls 99 and 99a. Preferably, the adjustable pressure regulator will respond to any excess in pressure above that for which the indicator is set by actuating an audible signal (not illustrated) when the air is vented to the atmosphere. It will be understood that no contamination of the surrounding atmosphere with the fumes or vapors from the metering bowl will take place during the venting of this excess air to the atmosphere since there is no direct connection between the air channel, at a location beyond the air control valve, and the liquid within the bowl. When air is being admitted, under pressure to the free air space above the liquid level, the air control valve is closed, hence air is transmitted directly to the air tank for storage without fluid contamination.

Figure 17:
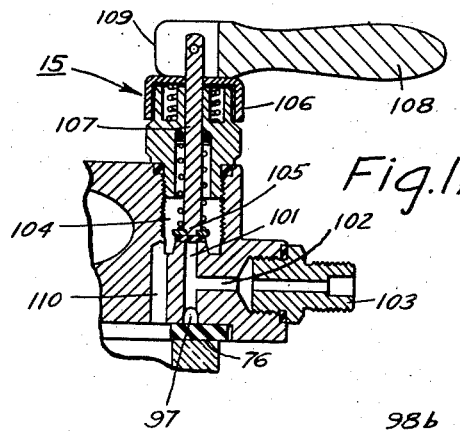
Fig. 17 is a sectional detail on the line 17—17 of Fig. 14.

The flow channel 97 leads to a passage 101, see Fig. 17, which has a lateral passage 102 communicating through a nipple 103 and the conduit 44 with the air tank 11; the upper end of the passage 101 is normally closed by an air control valve 15 seated in a recess 104, which includes a spring pressed disk valve 105, a spring pressed cap 106, a valve stem 107, and a manually turnable handle 108 which is pivoted to the upper end of the valve stem and has a bifurcated end cam 109 which presses the cap 106 down and holds the valve 105 open when the handle is turned to upright position. When the valve 105 is in open position, the pressure air from the tank flows through a by-pass 110 into the fluid bowl 76 to place the fluid therein under pressure.

The mixing head has a mixing chamber or passage 111, see Fig. 16, which has an outflow duct 112 normally closed by a flow valve mechanism 17 similar in construction and operation to the valve mechanism 15, and seated in a recess 113. When the valve 105, Fig. 17, is opened, the fluid in the bowl 76 is placed under air pressure. This pressure condition will force the fluid upwardly through the fluid lift and metering outlet tube 115, Fig. 15, which has a filter inlet 116, when the valve 114, Fig. 16, is in an opened position. A metered volume of pressure air is discharged through the metering orifice 117 to commingle and flow outwardly from the mixing passage 111 when the valve 114 is in an opened position. The metered proportions of fluid and air, under pressure, exit through an outflow nipple 119, and through a conduit 120, Fig. 20, to a spray nozzle or nozzles 16, Fig. 21, which are positioned in the induction system of an engine. Threaded adjustment of the members 115 and 117, or substitution of different orifice sizes therein will control the relative proportions of fluid and air volume flow and resistance to such flow, as desired.

Figure 20:
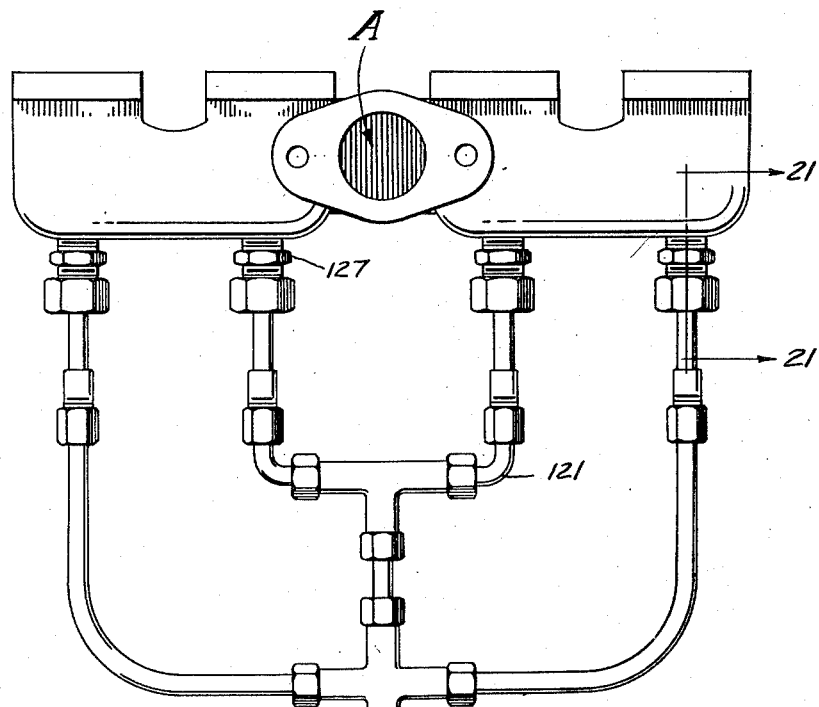
Fig. 20 is a view of an illustrative automative induction system mounting.

Although not illustrated in Fig. 20, a modified adaptor plate with a nozzle or nozzles for introduction directly into "A" may be utilized. Furthermore, the nozzle or nozzles may be movable laterally within a holding and sealing fitting in order to provide for varying the direction of spray into the induction system. It may be particularly desirable to have the sprays from adjacent nozzles directed so they intercept each other, thereby deflecting and better dispersing the finely comminuted particles.

Figure 21:
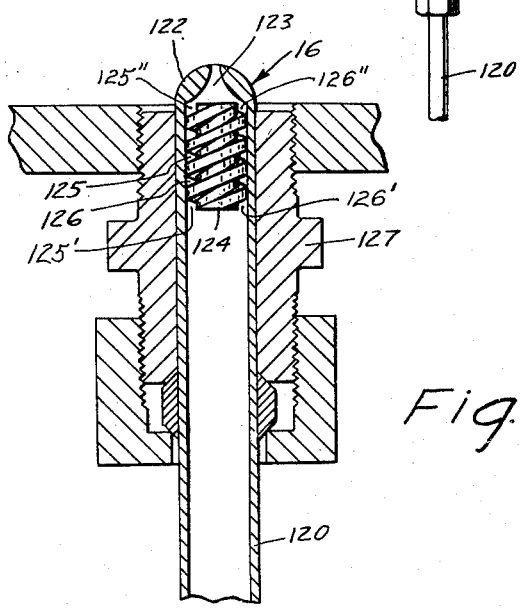
Fig. 21 is an enlarged sectional detail of one injection spray nozzle.

Each spray nozzle 16, Fig. 21, includes a tip portion 122 having an arcuate conical outflow chamber and metering orifice 123, with a helical plug 124 fitted into the holding tube 16 to direct the inflowing fluid and air streams into the double helical peripheral flow passages 125, 126, and which is seated without interference to the outflow passages of the member 124 adjacent to the conical converging portion of the chamber 123. The spray nozzle or nozzles are preferably slidably mounted in connections 127 to provide for the insertion of the nozzle tip into the induction system at any required point or angle. The spray nozzle or nozzles may be formed at any angle from a straight line to permit insertion and injection into the induction system of an engine with consideration of the contours therein, and to avoid impactation of the injected material on the surfaces thereof. The double helical flow passages 125, 126 in combination with the conical outflow chamber 123 cooperate to cause finely comminuted particles to issue from the orifice thereof in the form of a hollow, rotating vapor-mist spray cone, centrally within which issues a rotating, high velocity and expanding conical air stream. This action is achieved by the varying centrifugal forces exerted on the fluid and air streams as these elements pass through the separate flow paths of the helical double grooved element 124 in that the liquid stream is caused to expand outwardly into the chamber 123 and to progress forwardly to the peripheral outline of the orifice whereas the inwardly rotating air stream progresses to the nozzle orifice to frictionally and explosively expand and comminute the minimum fluid film which is rotating at the periphery of the nozzle orifice. Since the pressurized air stream is much lighter than the fluid driven thereby, the air starts to pass through, say, the peripheral inlet 126', along the corresponding helical groove 126 and out the peripheral opening 126". This has been found to result in actually causing the fluid to travel along the other helical groove 125, entering the peripheral inlet 125' and leaving the peripheral opening 125". Since both the air stream and the starting-fluid stream are thus caused to travel separate helical paths 125, 126 under pressure, by the time they emerge at the upper end of the plug 124, they are in the form of respective rotating or whirling streams of starting-fluid particles and air. Since, again, the fluid and the air are of different masses, the centripetal forces acting upon the whirling stream of air and upon the whirling stream of starting-fluid particles will not be equal, so that the whirling air path will form within the whirling starting-fluid path. These two whirling paths are caused to be successively confined by the substantially conical shape of the orifice 123 of the nozzle 16, so that when they emerge from the nozzle 16, the air is found to produce a whirling inner cone of carrier air which serves ot spread outward an outer cone of rotating particles of the starting fluid. It is this imparting of the whirling or rotating movement under pressure to the air and starting-fluid streams, and then the confining of the whirling streams by successive degrees as an accelerative effect upon the streams as they pass through the conical orifice 123 in the nozzle 16, that has been found to produce one of the amazing phenomena underlying the present invention—namely, a mist of conically rotating starting-fluid particles that are so finely comminuted as to be in substantially vapor form. The injection of this mist into the induction system of a combustion chamber has been found to give rise to the remarkable cold-engine starting results obtained with the aid of the present invention as herein described.

*The mechanism of controlling intake air and exhaust gases*

The ambient temperature air admitted to the induction system of an engine, with particular reference to a diesel combustion engine, may be regulated, proportioned or interrupted by a valve or valve device 200 as illustrated in Fig. 23. This action permits the operation of the auxiliary engine starter as a primary source of injection of a combustible mixture to an engine, both to avoid the quenching reaction of a cold air mass and to reduce the work load on the pistons by a reduction of the volume of incoming air which results in a substantial gain in engine revolutions per minute for an indicated torque potential and facilitates the rapid inflammation of the auxiliary charge and subsequent combustion of the primary fuel charge. A volume control of the primary carrier air may thus be established through manipulation of the control valve 200 to provide for a maximum saturation of a minimum volume of air by a combustible mixture for immediate and uniform distribution of the mixture to the cylinder or cylinders of the engine. The valve 200 may be manually controlled or it may be controlled by mechanical means to serve as an air throttle valve.

The inflamed exhaust gases which issue from the exhaust system 203 of an engine, with particular reference to a diesel combustion engine, may be regulated, proportioned or interrupted by a valve or valve device 202, as illustrated in Fig. 24. This action permits the operation of the auxiliary engine starter to initiate rapid compression ignition and continuous combustion wherein the developed heat is retained more completely within the combustion area to facilitate rapid warm-up and the clean combustion of the primary engine fuel by a restriction or stoppage of the exhaust discharge of the heated elements from the combustion chamber or chambers of the engine.

Comparative cranking and ignition data

Figure 22:
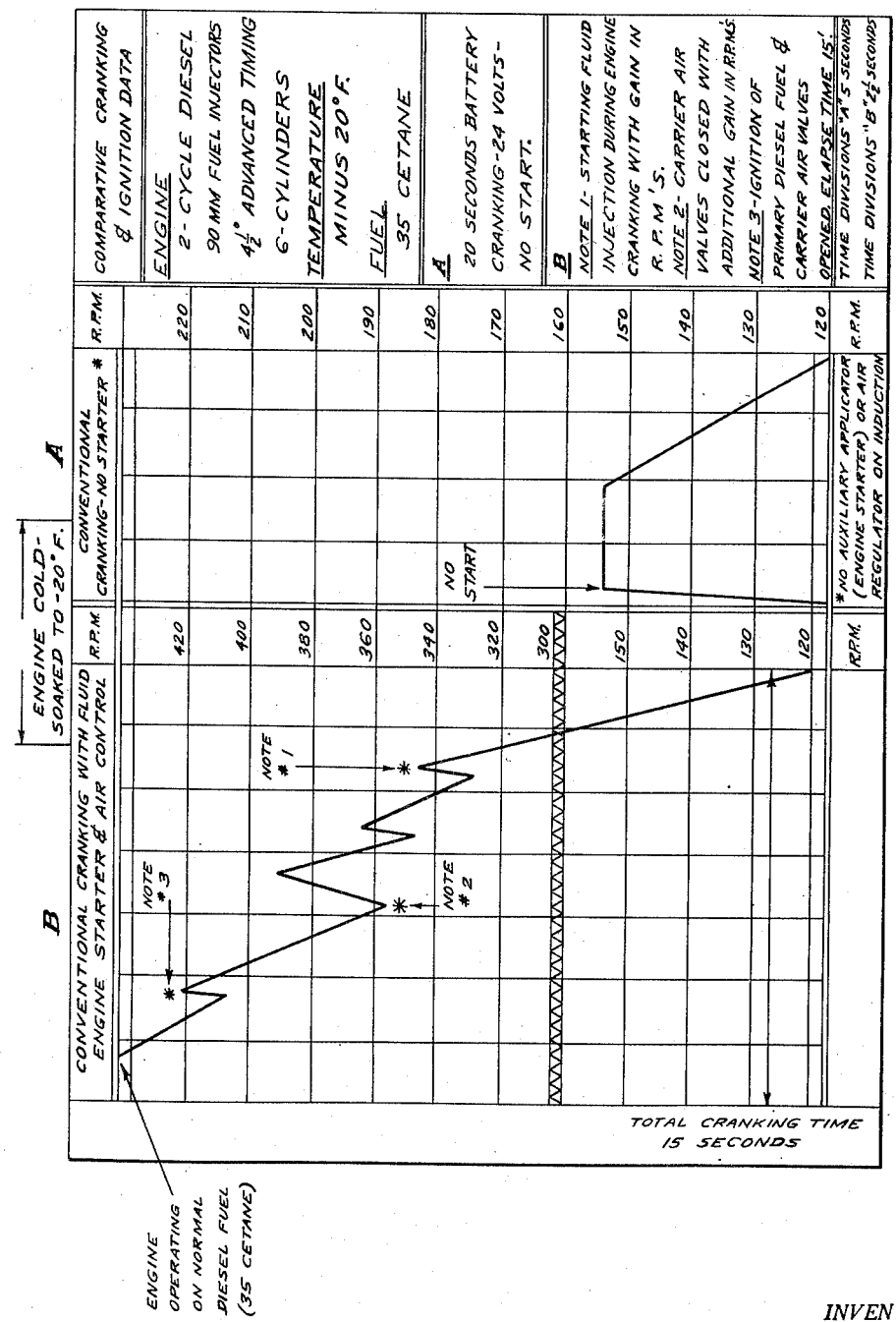

Fig. 22 is representative of comparative starting techniques and typical end results which apply in the attempt to initiate ignition within a conventional diesel engine at low ambient temperature conditions.

Section "A" of Fig. 22 illustrates a battery cranking interval by the use of a curve line which is plotted to show, along the abscissa, the duration of cranking and, along the ordinate, the speed of engine cranking. The maximum developed engine R. P. M. is indicated to be a factor of substantially 154. At this engine speed, and at the indicated engine and ambient air temperature of minus 20 degrees F., inflammation of the primary fuel charge could not be developed within the engine since the critical ignition temperature of the primary fuel could not be attained by the reciprocating action of the pistons and by the compression of the inducted air mass.

Section "B" of Fig. 22 illustrates a battery cranking interval by the use of a curve line which is plotted to show, along the abscissa, the duration of cranking and, along the ordinate, the speed of engine cranking with the use of the auxiliary engine starter and a means of controlling the induction of ambient air to the engine in accordance with the present invention. It will be noted that within two and one half seconds the cranking speed of the engine had exceeded the battery cranking potential 154 of section "A." At ten seconds, the air control valves were closed with the continuous injection of starting fluid, and with a secondary gain of engine speed between note No. 1 and note No. 2. At thirteen and one half seconds, clean ignition of the primary diesel fuel had been developed and the engine was responsive to direct throttle control. At this point, note No. 3, primary pressure air to the auxiliary engine starter was closed off with a continuing discharge of starting fluid due to the residual pressurized air within the air-fluid metering cavity, and the purpose of this specific method of application of fluid-air mixture, which is a result of the designed construction of the apparatus, is to sustain ignition of the primary diesel fuel after the first fire, and to accelerate the warming-up characteristics of the engine.

The use of the apparatus as an auxiliary engine starting device

Starting devices as constructed and utilized heretofore have required a substantial "know-how" on the part of the operators in manipulating and controlling the application of starting fluids, and have been limited in effectiveness by the volume of available fluid, as contained within capsule-type aids; by the method of introduction, as by hydraulic ram action with resulting solid fluid injection; by the lack of any determinable and reproducible rate and duration of discharge of the starting fluid to the engine; and, by the dangers inherent in the discharge of excessive fluid quantities to the engine and by the exposure of the operators to such fluids.

The herein described auxiliary engine starting device is simple, may be used as a portable applicator on a number of engines, is constant in the quantity of fluid-air discharge for an indicated air pressure, is readily controllable by a single operator in connection with other required mechanical manipulations, and ensures positive starting and sustained ignition, with complete safety, by metering a starting fluid to produce a high initial input and a decreasing flow pattern, thoroughly discharging a specific volume of starting fluid with carrier air under pressure, and introducing the starting mixture into the induction system of an engine in finely comminuted form to develop a saturated atmosphere therein for immediate and even distribution, by aspiration, to the cylinder or cylinders of an engine.

The bulk fluid supply compartment 10 is filled first with starting fluid by inserting therein an inverted fluid container 28, Fig. 4, and holding it firmly therein by the use of the bulk fluid supply compartment closure 24, while piercing the sealing cap 30 of the fluid container by the piercing mechanism 31. The starting fluid and air metering reservoir 12 is then filled with a fixed volume of starting fluid by opening the manual fill valve 85. Control of fluid input to the fluid-air metering reservoir 12 is automatic, and the fluid level will not rise above the lower edge of the fill tube 88 due to the pressure which will be developed in the air space above the fluid level.

The pressure regulator 207 is then operated to establish a predetermined and pre-set air pressure within the air supply tank 11. The air supply tank 11 is then pressurized by means of the hand pump 13, or by the use of an external source of pressurized air. When the indicated and regulated air pressure has been developed, such pressure is communicated from the air supply tank 11 to the fluid-air metering reservoir 12, and the supply of starting fluid is placed therein under pressure. The auxiliary engine starting device is now ready for use. At this point of operation, the air control valve handle 108, is positioned in an upright manner, and said valve 105 is opened.

Coincidental with initial engine cranking, the fluid-air control valve handle 17 is positioned in an upright or opened postion, and the metered and proportioned volume of starting fluid and air is communicated through the open mixture valve mechanism 114, Fig. 15, and the connecting conduit 120 to the injection spray nozzle or nozzles 16, and thence to the induction system of the engine. The starting fluid and air in the mixture are separated by the double helical flow passages 125, 126 contained within the nozzle or nozzles 16, and pass through the conical converging area 123 of the nozzle as an outer shell of revolving fluid with an inner core of revolving air, to issue the fluid as finely comminuted particles within a hollow cone, rotating vapor spray.

The before-mentioned opposing-nozzle arrangement of Fig. 23 involves curved nozzles 16 which have been found to operate as above described irrespective of the degree of curvature from the inlet conduit to the nozzles and thus provide greater facility for insertion in limited spaces. In Fig. 23, moreover, a flexible conduit 120', replacing the conduit 120 of Fig. 1, connects the preferably portable apparatus of Fig. 1 through a self-sealing coupler $C_1$, $C_2$ and the conduit 201 to the nozzles 16, thus permitting easy use with one or more engines. A plurality of $C_2$ coupler portions may then be mounted on one or more engines for use with $C_1$ as required. The nozzles 16 may, on the other hand, converge along straight lines toward one another, as shown in Fig. 25, to provide at least partially overlapping sprays that have been found to generate maximum dispersion of the vapor-mist particles. The nozzles of Fig. 25, for example, might be inserted into the bracket A of Fig. 20. The degree of opposition or convergence of the nozzles for producing, by the merging of the sprays, an optimum sheet of dispersed particles, may vary from straight-in-line face-to-face opposition to any desired angle of convergence, including the substantially 90°-angle of Fig. 25. The curving of the nozzle, moreover, serves to prevent impactation of the fluid upon the walls of the intake channel, serving, rather, to direct the fluid flow over the desired area.

When the saturated charge is aspirated by the reciprocating action of the piston or pistons within the cylinder or cylinders of an engine, compression or spark ignition of the combustible, compressed charge is prompt, and usually takes place within two to twenty seconds at subnormal or normal engine cranking speeds, and at extremely low ambient air and engine temperatures. Since ignition is developed rapidly and the engine may be motored or cranked by the controlled and continuous combustion of the saturated air charge, dependence on primary cranking energy is limited to the requirement of a first fire in the saturated, combustible charge. Upon ignition, the air control valve may be placed in a closed position, which condition provides for a continuing discharge of an Aerosol mixture to the engine, as illustrated by Fig. 26, to sustain ignition and accelerate engine warm-up, due to the residual air pressure contained within the fluid-air metering reservoir. Fig. 26 illustrates the position of a piston in a cylinder of a diesel engine and the intake valve mechanism thereof at the instant that the starting fluid commences to spray into the intake manifold of the induction system. Immediately following this, the intake valve opens and the piston moves downward developing a low-pressure atmosphere within the combustion chamber area for aspiration of the starting fluid directly into the combustion chamber or cylinder. The dotted line positions of the intake valve and piston assembly illustrate the instant following the injection of the starting fluid. If desired, however, this phenomenon may be produced prior to the injection of the starting fluid material by causing the cycling of the engine to effect the above control. If desired, the injection nozzle could also be located at a position such as shown at 16' in Fig. 26. Injection of the starting fluid into the air stream within the induction system may, indeed, be accomplished at any number of points within the induction system including the injection into the combustion system by means of providing an induction nozzle or nozzles with a suitable check valve or valves within the nozzle assembly to prevent excessive pressure being built up at the nozzle orifice. The normal sequence of engine operation would follow the preliminary cycling and the charge would be compressed by the action of the piston, and at a suitable timing interval primay diesel fuel would be injected as shown in Fig. 26 for commingling a combustion therein.

Under certain operating conditions, the discharge of the starting fluid to the engine may be throttled, with a typical mechanical response by the engine, to determine the completeness of the combustion characteristics of the primary engine fuel.

It has been established, also, that the use of warm starting fluid is with benefit to prompt ignition characteristics at extremely low ambient air and engine operating temperatures. This condition may be accomplished either by the use of pre-warmed starting fluid, which may be transferred as indicated to the bulk fluid container, or by the use of an auxiliary calrod-type heating element, not shown, immersed within the fluid-air metering reservoir and operated to elevate the fluid temperature therein.

While this indicated operating technique provides for a specific flow and discharge pattern from the apparatus, under certain conditions it may be advantageous to operate the device on a continuous basis, and this condition is possible by the employment of the hand pump as a source of pressure against the volume of fluid within the fluid-air metering reservoir 12 or the bulk fluid container 10, with both control valves 15 and 17 in an open position, and with the manual fill or fluid transfer valve 85 held open in a locked position.

It has been established that variables in fluid and air volumes are factors which are involved in the starting characteristics of several different engines of unrelated displacements and starting characteristics, and for this reason, changeability of air and fluid metering orifices within the fluid-air metering reservoir and changeability of the volume capacity of the fluid-air metering reservoir are common to the use and application of the apparatus, under such operating conditions.

Further modifications will occur to those skilled in the art and all such are considered to fall within the spirit and scope of the invention as defined in the appended claims.

What is claimed is:

1. Apparatus for introducing a spray of a volatile starting fluid into the induction system of a combustion chamber and the like, comprising a first compartment for storing the volatile starting fluid, a second compartment closed to the atmosphere for storing under pressure a predetermined volume of air, a third compartment having an inlet and an outlet, the inlet being connected by a valving mechanism to the first compartment to fill the third compartment with a predetermined volume of the volatile starting fluid, the inlet extending a predetermined distance within the third compartment to permit the fluid to fill to the level of the end of the inlet, thereupon to effect closure of the said valving mechanism in order to maintain a predetermined volume of fluid within the third compartment bounded by a predetermined air space, means for introducing air stored under pressure in the second compartment into the said air space within the third compartment to drive the predetermined volume of the volatile starting fluid through the third-compartment outlet, a fluid-air mixing chamber, means for simultaneously introducing air stored under pressure in the second compartment into the mixing chamber as a jet, means for combining the starting fluid driven through the third-compartment outlet with the said jet to drive the starting fluid along the jet, and means for injecting a spray of the driven starting fluid into the induction system of a combustion chamber and the like.

2. Apparatus as claimed in claim 1 wherein valving means is provided between the mixing chamber and the injecting means for controlling the rate of discharge of the combined starting fluid and air jet for throttling purposes.

3. In apparatus for introducing a finely comminuted mist of a volatile starting fluid into the induction system of a combustion chamber and the like, a plurality of injection nozzles each having an inlet for receiving pressured streams of air and starting fluid, a first portion connected to the inlet provided with at least a pair of openings positioned so that once the starting-fluid stream enters one of the openings the received stream of air will thereupon force its way through the other opening, the openings each communicating with a separate substantially helical channel in order to set the streams of starting fluid and air into rotation as they emerge from their respective channels, and a second terminal portion comprising a converging outlet aperture region for confining the rotating streams of starting-fluid particles and air to produce emerging from the said outlet a rotating inner cone of pressurized air spreading an outer cone of rotating particles of the starting fluid as a finely comminuted mist, the nozzles being oriented so that the respective mists produced thereby at least partially overlap one another.

4. In apparatus for introducing a finely comminuted mist of a volatile starting fluid into the induction system of a combustion chamber and the like, a plurality of injection nozzles each having an inlet for receiving pressured streams of air and starting fluid, a first portion connected to the inlet provided with at least a pair of openings positioned so that once the starting-fluid stream enters one of the openings the received stream of air will thereupon force its way through the other opening, the openings each communicating with a separate substantially helical channel in order to set the streams of starting fluid and air into rotation as they emerge from their respective channels, and a second terminal portion comprising a converging outlet aperture region for confining the rotating streams of starting-fluid particles and air to produce emerging from the said outlet a rotating inner cone of pressurized air spreading an outer cone of rotating particles of the starting fluid as a finely comminuted mist, the nozzles being oriented with their terminal portions facing one another.

5. Apparatus as claimed in claim 1 and in which means is provided for varying the relative volume flow and resistance flow of the pressurized air and the fluid driven through the third-compartment outlet.

6. Apparatus as claimed in claim 1 and in which the first compartment comprises means for receiving a sealed container of starting fluid and means for puncturing the same to provide access to the fluid, the first compartment being closed to seal the fluid and its vapors from the outside.

7. Apparatus as claimed in claim 1 and in which means is provided for controlling the volume of external air aspirated to the said induction system.

8. Apparatus as claimed in claim 1 and in which means is provided for closing off in varying degrees the discharge of inflamed gases from the exhaust resulting from combustion in the combustion chamber and the like.

9. A method of initiating combustion in a combustion chamber and the like that comprises, storing a volatile starting fluid external to the chamber and the like, withdrawing a predetermined measured volume only of the stored starting fluid, storing a predetermined volume of compressed air related to the predetermined measured volume of the starting fluid, introducing air from the stored compressed air into the predetermined measured volume of starting fluid to drive the starting fluid to a predetermined point, simultaneously introducing at the predetermined point a jet of air from the stored compressed air to carry the starting fluid driven to the predetermined point along the jet, comminuting the driven fluid into a plurality of fine vapor mists of the starting fluid, and injecting the vapor mists toward one another into the induction system of a combustion chamber and the like during the aspiration period in the combustion chamber and the like.

10. A method of initiating combustion in a combustion chamber that comprises, storing a volatile starting fluid external to the chamber, storing a predetermined volume of compressed air, introducing air from the stored compressed air into the stored starting fluid to drive the starting fluid to a predetermined point, simultaneously introducing at the predetermined point a jet of air from the stored compressed air to carry the starting fluid driven to the predetermined point along the jet, comminuting the driven fluid into a fine vapor mist of the starting fluid, injecting the vapor mist into the combustion chamber and the like during the aspiration period in the combustion chamber and the like, and controlling the volume of external air aspirated to the combustion chamber and the like.

11. A method of initiating combustion in a combustion chamber that comprises, storing a volatile starting fluid external to the chamber, storing a predetermined volume of compressed air, introducing air from the stored compressed air into the stored starting fluid to drive the starting fluid to a predetermined point, simultaneously introducing at the predetermined point a jet of air from the stored compressed air to carry the starting fluid driven to the predetermined point along the jet, comminuting the driven fluid into a fine vapor mist of the starting fluid, injecting the vapor mist into the combustion chamber and the like during the aspiration period in the combustion chamber and the like, and closing off at least partially the exhaust discharge of inflamed gases resulting from combustion in the combustion chamber and the like.

12. A method of creating a saturated atmosphere of combustible starting fluid in the combustion chamber of an engine that comprises, injecting a vapor-mist spray of the starting fluid into the combustion chamber in order to develop a saturated combustible atmosphere therein, compressing a charge of the starting fluid within the chamber to elevate the temperature through thermal and chemical reactions in order to provide a primary igniter, introducing fuel into the chamber whereby contact of the fuel with the primary igniter will produce prompt combustion of the fuel, thus eliminating the depressive effect of contact of fuel with an unsaturated, compressed air mass in the chamber, tapering off the injection of the vapor-mist spray in a predetermined manner in order to satisfy the combustion requirements of the engine without extinguishing combustion, and throttling the exhaust from the chamber at any desired predetermined time during the starting-fluid injection in order to retain the developed heat of combustion due to compression of the said saturated atmosphere within the chamber.

References Cited in the file of this patent

UNITED STATES PATENTS

| | | |
|---|---|---|
| 1,867,475 | Ricardo | July 12, 1932 |
| 2,175,743 | Coffman | Oct. 10, 1939 |
| 2,271,383 | Wynne et al. | Jan. 27, 1942 |
| 2,287,900 | Parker | June 30, 1942 |
| 2,601,562 | Schoeppner et al. | June 24, 1952 |
| 2,681,053 | Moody | June 15, 1954 |
| 2,709,425 | Kuepfer et al. | May 31, 1955 |